Figure 1:
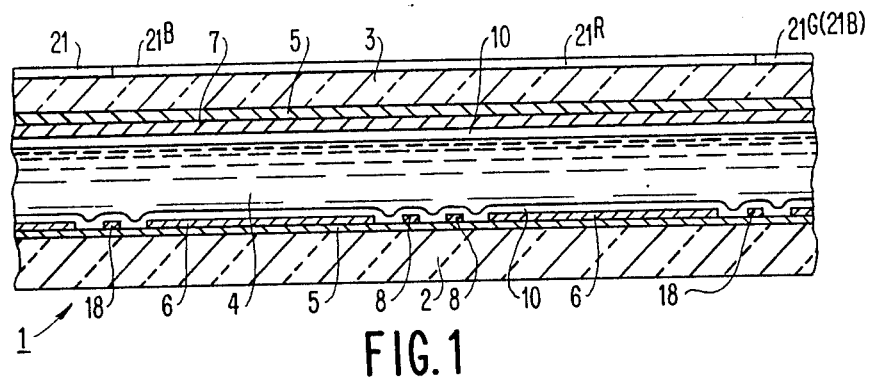

United States Patent [19]

Kuijk

[11] Patent Number: 4,943,802
[45] Date of Patent: Jul. 24, 1990

[54] DISPLAY DEVICE

[75] Inventor: Karel E. Kuijk, Eindhoven, Netherlands

[73] Assignee: U.S. Philips Corporation, New York, N.Y.

[21] Appl. No.: 319,004

[22] Filed: Mar. 3, 1989

Related U.S. Application Data

[63] Continuation-in-part of Ser. No. 208,185, Jun. 16, 1988.

[30] Foreign Application Priority Data

Dec. 7, 1988 [NL] Netherlands ............ 8802997

[51] Int. Cl.⁵ .................................. G09G 3/00
[52] U.S. Cl. .................... 340/784; 340/719; 340/784; 350/333; 350/334
[58] Field of Search ............ 340/719, 784, 765, 785, 340/787:805, 825.81, 825.82; 350/333, 334, 339 F, 340

[56] References Cited

U.S. PATENT DOCUMENTS

| | | | |
|---|---|---|---|
| 4,393,380 | 7/1983 | Hosokawa et al. | 350/334 |
| 4,485,380 | 11/1984 | Soneda et al. | 340/784 |
| 4,583,087 | 4/1986 | Van de venne | 340/719 |
| 4,626,841 | 3/1986 | Togashi | 340/805 |
| 4,641,135 | 2/1987 | Hilbrink | 340/784 |
| 4,709,992 | 12/1987 | Ueno | 350/333 |
| 4,715,685 | 12/1987 | Yaniv et al. | 350/333 |
| 4,728,172 | 3/1988 | Cannella | 350/333 |
| 4,745,406 | 5/1988 | Hayashi et al. | 340/784 |
| 4,748,445 | 5/1988 | Togashi et al. | 340/784 |
| 4,794,385 | 12/1988 | Kuijk | 340/719 |
| 4,810,059 | 3/1989 | Kuijk | 350/333 |
| 4,811,006 | 3/1989 | Kuijk | 340/719 |
| 4,836,650 | 6/1989 | Morin et al. | 350/333 |

Primary Examiner—David K. Moore
Assistant Examiner—M. Fatahiyar
Attorney, Agent, or Firm—John C. Fox

[57] ABSTRACT

In an electro-optical display device (1), in which a plurality of tracks (8, 18) for the purpose of driving via active elements (9, 19) is provided on a supporting plate (2), the transparent electrodes (7, 11) on the other supporting plate (3) follow a meandering path so as to obtain an optimum color filter (21) with a so-called delta configuration.

5 Claims, 4 Drawing Sheets

DISPLAY DEVICE

This application is a continuation-in-part application of previous application Ser. No. 208,185, filed June 16, 1988, and the benefit of such earlier application is hereby claimed for this application for all similar parts.

The invention relates to a display device comprising an electro-optical display medium between two supporting plates, a system of pixels arranged in rows and columns, with each pixel being formed by plates, and a system of row and column electrodes for presenting selection and data signals by means of which a range of voltages dependent on the electro-optical display medium can be presented across the pixels for the purpose of picture display.

A display device of this type is suitable for displaying alpha numerical information and video information by means of passive electro-optical display media such as liquid crystals, electrophoretic suspensions and electrochromic materials.

A display device of the type described in the opening paragraph is known from U.S. Pat. No. 4,811,006. In the device shown in this application diodes are used as non-linear switching elements in an active matrix, namely two diodes per pixel. Two successive rows of pixels each time have one row electrode in common. The drive mode is such that in television applications (for example with a drive mode in accordance with the PAL or NTSC system) the information of two successive even and odd lines is presented across each pixel at an alternating polarity and at the field frequency. The information of a pixel is therefore determined by the average signal of two successive even and odd lines. Since each time two rows of picture electrodes are simultaneously written because two successive rows each time have one row electrode in common, such a device provides little flexibility as regards the choice of colour filters to be used. In fact, this choice is limited to strip-shaped colour filters.

In the copending U.S. Pat. application 208,185 filed June 16, 1988 in the name of the Applicant a picture display device of the type mentioned in the opening paragraph is described in which the row electrodes are not common and in which the rows of pixels are separately driven, while the fact that the row electrodes are not common does not lead to an increase in the number of connections.

This provides a wide freedom of choice of the colour filters to be used.

This is possible by giving the pixels a given adjustment per row by charging or discharging the capacitances associated with these pixels after first having discharged or charged them too far (either or not accurately).

To this end such a picture display device is provided with means for applying, prior to selection, an auxiliary voltage across the pixels beyond or on the limit of the voltage range to be used for picture display.

In the embodiment shown in the said Patent Application diodes are used as non-linear switching elements.

It has been proposed in the allowed U.S. Pat. application 034,194 filed April 1981 to increase the resolution, notably of colour picture display devices by composing colour elements with the aid of picture cells from juxtaposed rows. The colour elements of juxtaposed rows are shifted relative to one another over half a period.

Such an arrangement of colour elements leads to problems in a device of the type described in the U.S. application 208,185 because tracks (usually metal tracks) conducting in the column direction are arranged on the first supporting plate for the purpose of presenting data voltages and auxiliary voltages. If the colour elements (pixels) per row are shifted over half a period, these tracks will follow a meandering path. Consequently, they get longer so that the electrical resistance and the risk of an open column conductor increase. On the other hand the risk of short-circuit between adjoining conducting tracks increases at the area of the corners of the meandering pattern. Since these tracks also partly follow a path in the direction of the rows, the effective size of a pixel decreases.

It is an object of the invention to solve this problem by providing a device of the type described in the opening paragraph in which an arrangement of the colour elements as described can be used without the said problems occurring.

The invention is based inter alia on the recognition that the column electrodes and the electrodes for the auxiliary voltage can be formed as straight tracks by structuring the row electrodes in such a way that they follow a meandering path and by a suitable arrangement of the colour elements.

A device according to the invention is characterized in that the picture electrode on one of the supporting plates is connected in an electrically conducting manner to the common point of two non-linear switching units which are arranged in series between a column electrode for data signals and an electrode for applying, prior to selection, an auxiliary voltage across the pixels beyond or on the limit of the voltage range to be used for picture display, and in that the other supporting plate is provided with row electrodes which follow a meandering path.

When structuring the row electrodes, ample tolerances can be used because the other supporting plate is not subjected to any further photolithographic steps. Consequently, substantially no short-circuits occur, while the effective size of the pixels remains the same. Moreover, the extra resistance introduced by the meandering path of the row electrodes remains so low that it does not affect or hardly affects the performance of the device.

The invention is not only applicable to colour display devices but also to monochrome devices in which pixels which are shifted relative to one another in juxtaposed rows are used for the purpose of a better perception.

In a colour display device the pixels coincide with the colour elements of a colour filter.

Figure 2:
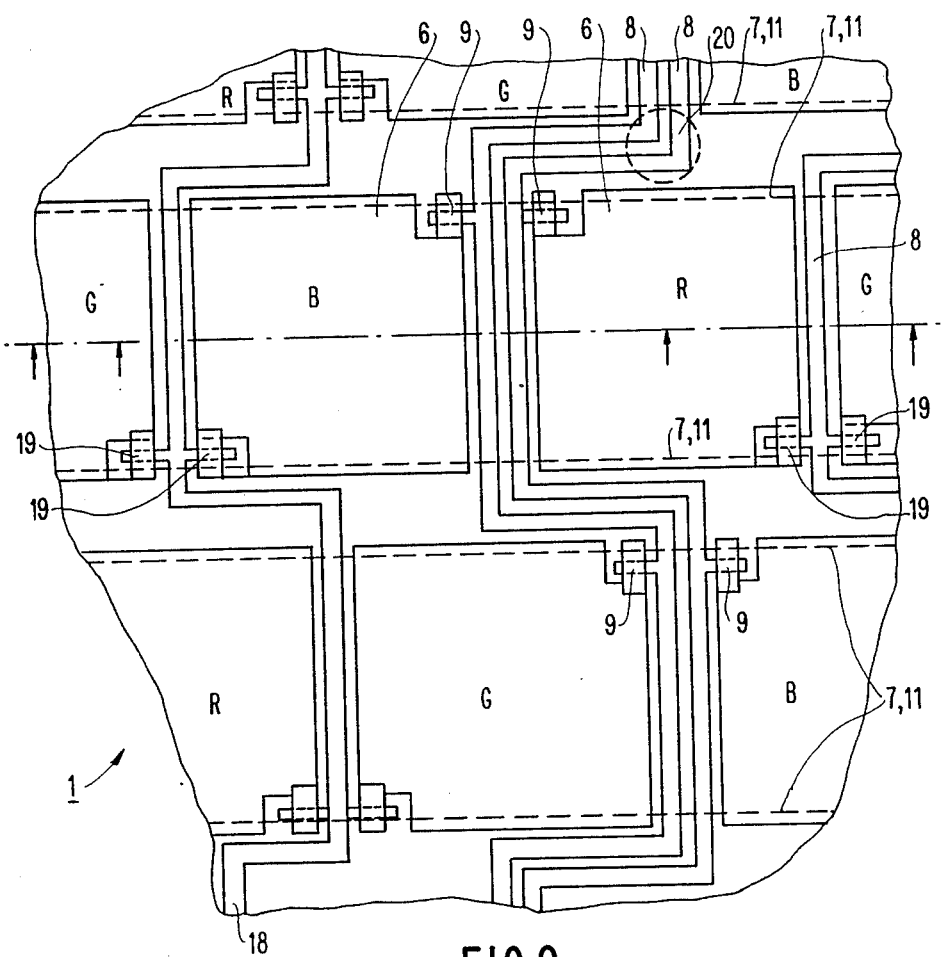
Figure 3:
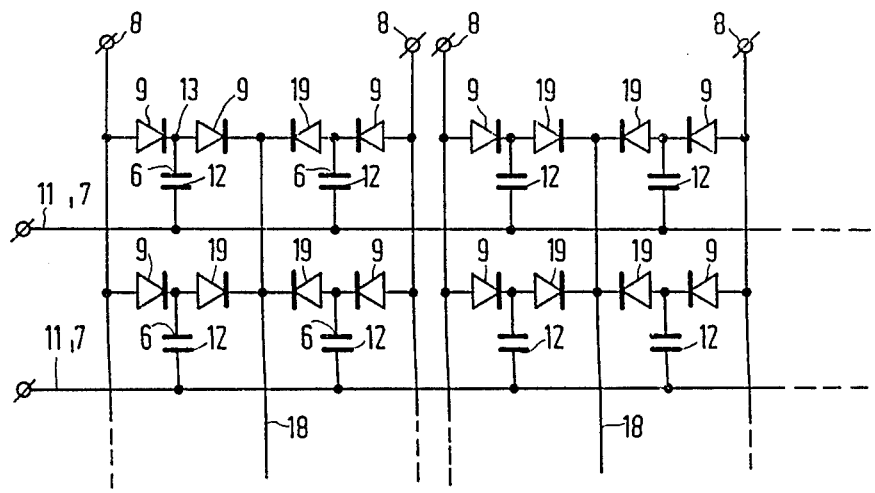
Figure 4:
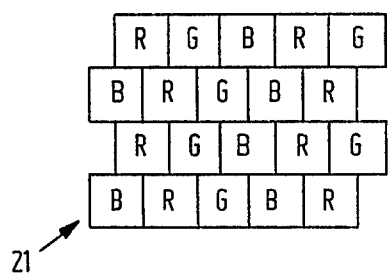
Figure 5:
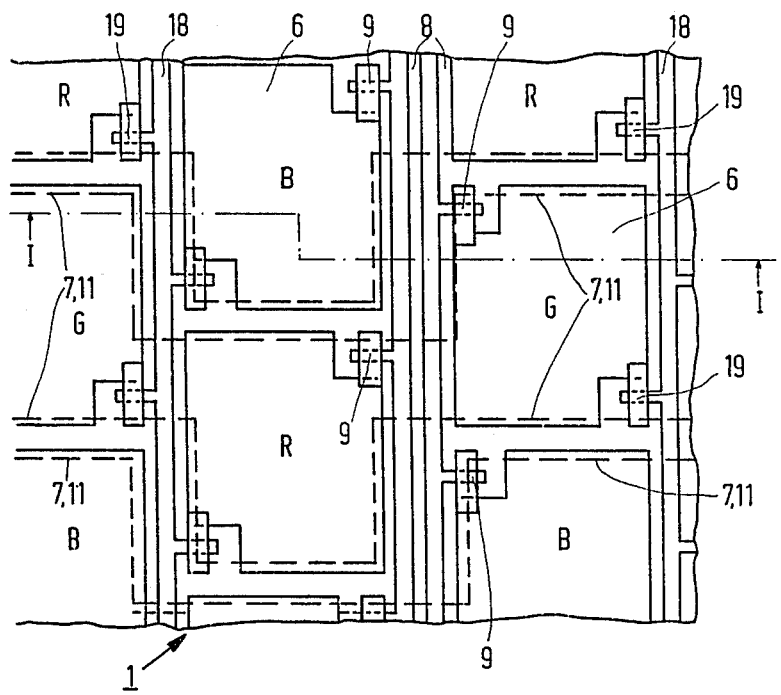
Figure 6:
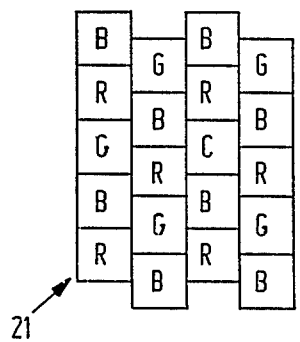
Figure 7:
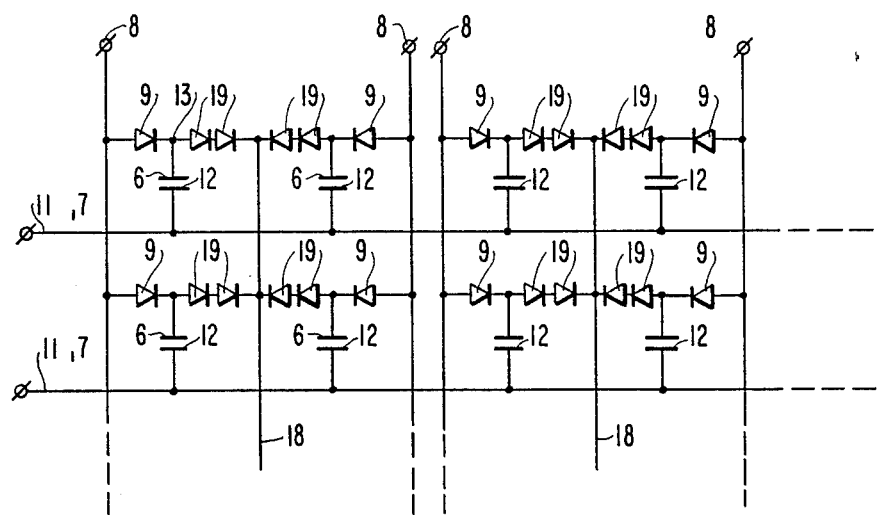

Embodiments of the invention will now be described in greater detail with reference to the accompanying drawings in which FIG. 1 is a diagrammatic cross-section of a display device taken on the line I—I in FIGS. 2 and 5, FIG. 2 is a diagrammatic plan view of the device of FIG. 1, FIG. 3 is a diagrammatic representation of the device, FIG. 4 shows diagrammatically a colour filter associated with the device of FIG. 2, FIG. 5 is a plan view according to the invention, FIG. 6 shows a colour filter associated with the device of FIG. 5, and FIG. 7 shows another embodiment of the device of FIG. 3.

The Figures are diagrammatic and not to scale. Corresponding components are usually denoted by the same reference numerals.

FIGS. 1 and 2 are a diagrammatic cross-section and a plan view, respectively, of a part of a display device, in this embodiment a liquid crystal display device 1 which has two supporting plates 2 and 3 between which, for example a (twisted) nematic, a ferro-electric or another liquid crystalline material 4 is present. The inner surfaces of the supporting plates 2 and 3 have electrically and chemically insulating layers 5. A plurality of row and column-arranged picture electrodes 6 of indium tin oxide or another electrically conducting transparent material is arranged on the supporting plate 2. Likewise, transparent picture electrodes 7 of, for example indium tin oxide, which are integrated to strip-shaped row electrodes 11, are arranged on the supporting plate 3. The facing picture electrodes 6, 7 constitute the pixels of the display device. A colour filter 21 with colour elements 21R, 21G, 21B is arranged on the supporting plate 3.

Column electrodes 8 (of, for example metal) are arranged between the columns of picture electrodes 6. Each picture electrode 6 is connected to a column electrode 8 by means of a switching unit, in this embodiment a diode 9 which is shown diagrammatically in FIG. 2. Furthermore, liquid crystal orienting layers 10 are provided on the inner surfaces of the supporting plates 2 and 3. As is known, another orientation state of the liquid crystal molecules and hence an optically different state can be obtained by applying a voltage across the liquid crystal layer 4. The display device may be realized as a transmissive or a reflective device and it may be provided with one or two polarizers.

Auxiliary electrodes 18, which have two picture electrodes 6 in common in this embodiment and which are arranged on the side of the picture electrodes 6 different from that of the column electrodes 8, are also present between the columns of picture electrodes 6. The auxiliary electrodes 18 connect the picture electrodes 6 to a reference voltage via other switching units, in this embodiment diodes 19 which are diagrammatically shown in FIG. 2. This reference voltage is chosen to be such that, dependent on the voltages used on the selection line 11 and the electro-optical material used, the capacitance associated with the pixel can always be discharged via the diode 19 to a voltage value beyond or on the limit of the range of transition in the transmission/voltage characteristic of the relevant electro-optical material.

FIG. 3 shows diagrammatically the display device of FIGS. 1, 2. Pixels 12 constituted by facing picture electrodes 6, 7 are connected via the picture electrodes 7 to row electrodes 11 at one end, which together with the column electrodes 8 are arranged in the form of a matrix. The pixels 12 are connected to column electrodes 8 via diodes 9. They are also connected, via diodes 19, to an auxiliary electrode 18 which is each time common to two diodes 19. For a description of the operation of the device see U.S. application 208,185.

FIG. 4 shows diagrammatically a colour filter as can be used in the device according to FIG. 2. In addition to the above-mentioned advantage that the device has a high resolution, the use of such a filter with a so-called "delta" configuration has advantages as compared with track-shaped colour filters or filters having a diagonal structure where the structure of the straight and the oblique lines (particularly the blue lines) is visible in the picture.

However, a drawback of the structure shown is that the column electrodes 8, like the electrodes 18, follow a meandering path; consequently these (metal) tracks get longer, which increases the resistance and the risk of an open track. Simultaneously the risk of short-circuit increases at areas where two juxtaposed lines 8 extend at an angle (diagrammatically shown in FIG. 2 by means of the region 20). Due to the meandering path more space for the conducting tracks is required between the picture electrodes of two adjacent rows so that the effective surface area of the picture electrodes 6 decreases.

In the device shown in FIG. 5 this drawback is obviated by shifting the pixels in the column direction over half a period. The column electrodes 8 and the electrodes 18, which are connected to the picture electrodes 6 via diodes 9, 19, may be formed as straight tracks on the supporting plate 2. The row electrodes 7, 11 now follow a meandering path. The lines 8, 18 do not extend in the direction of the row between the picture electrodes so that a larger effective surface area of the picture electrode 6 can be obtained as compared with the device according to FIG. 2. The extra resistance of the meandering line electrode is such that it does not affect or hardly affects the performance of the device. The configuration of FIG. 6, which is identical to that of FIG. 4 but is rotated through 90°, can be used for the colour filter, with identical colour elements being shifted relative to one another in the column direction over one and a half periods.

Although colour picture display devices have been described hereinbefore, a plurality of picture electrodes may alternatively form a monochrome pixel.

It is alternatively possible to choose switching elements other than the diodes 9, 19, while the switching units may consist of a plurality of switching elements as shown in FIG. 7 as has been described in greater detail in the U.S. application 208,208 filed June 16, 1988 in the name of the Applicant. Redundancy in the switching elements can also be used as has been described in greater detail in the copending U.S. application 208,184 filed June 16, 1988 in the name of the Applicant.

I claim:

1. A display device comprising an electro-optical display medium between two supporting plates, a system of pixels arranged in rows and columns, with each pixel being formed by picture electrodes arranged on the facing surfaces of the supporting plates, and a system of row and column electrodes for presenting selection and data signals across the pixels for the purpose of picture display, characterized in that the picture electrode on one of the supporting plates is connected in an electrically conducting manner to the common point of two non-linear switching units which are arranged in series between a column electrode for data signals and an auxiliary electrode for applying, prior to selection, an auxiliary voltage across the pixels beyond or on the limit of the voltage range to be used for picture display in that the column and the auxiliary electrodes are in a straight track and in that the other supporting plate is provided with row electrodes which follow a meandering path.

2. A display device as claimed in claim 1, characterized in that the device comprises a colour filter whose colour elements coincide with the pixels.

3. A display device as claimed in claim 2, characterized in that identical colour elements of the colour filter are shifted relative to one another in the column direction over one and a half periods.

4. A display device as claimed in claim 1, characterized in that a switching unit comprises a plurality of switching elements.

5. A display device as claimed in claim 1 characterized in that the electro-optical medium is a liquid crystal.

* * * * *